United States Patent [19]

Gardiner et al.

[11] 4,139,480

[45] Feb. 13, 1979

[54] MULTIFUNCTIONAL ALTERNATING INTERPOLYMER LUBRICATING OIL ADDITIVE

[75] Inventors: John B. Gardiner, Mountainside; Irving Kuntz, Linden, both of N.J.

[73] Assignee: Exxon Research & Engineering Co., Florham Park, N.J.

[21] Appl. No.: 827,786

[22] Filed: Aug. 25, 1977

Related U.S. Application Data

[63] Continuation of Ser. No. 603,297, Aug. 11, 1975, abandoned.

[51] Int. Cl.² .............................................. C10M 1/32
[52] U.S. Cl. ........................... 252/51.5 A; 252/51.5 R; 526/16; 526/49
[58] Field of Search ..................... 252/51.5 A, 51.5 R; 526/16, 49

[56] References Cited

U.S. PATENT DOCUMENTS

| 3,076,791 | 2/1963 | Hollyday et al. | 252/51.5 R X |
| 3,076,792 | 2/1963 | Hollyday et al. | 252/51.5 R X |
| 3,647,731 | 3/1972 | Clough | 526/16 X |
| 3,761,458 | 9/1973 | Holler et al. | 252/51.5 A |
| 3,803,034 | 4/1974 | Dasch | 252/56 R X |
| 3,816,315 | 6/1974 | Morduchowitz et al. | 252/51.5 A |
| 4,026,809 | 5/1977 | Lachowicz et al. | 252/51.5 R X |
| 4,048,425 | 9/1977 | Kuntz | 526/16 X |

Primary Examiner—Delbert E. Gantz
Assistant Examiner—Andrew Metz
Attorney, Agent, or Firm—Roland A. Dexter; Frank T. Johmann

[57] ABSTRACT

Multipurpose lubricating oil additives having utility as viscosity index improvers, antiwear agents, sludge dispersants and pour point depressants comprise reaction products of (1) nitrogen compounds having one or more amino groups and/or (2) oxygen compounds having one or more hydroxyl, epoxide or ether groups and/or (3) sulfur compounds and/or (4) hydrogen with alternating interpolymers of monomers comprising (A) one or more polar monomers; (B) one or more olefinic monomers; and (C) a monomer similar to (A) or (B) but containing in addition a reactive group that reacts with (1), (2), (3) or (4).

8 Claims, No Drawings

MULTIFUNCTIONAL ALTERNATING INTERPOLYMER LUBRICATING OIL ADDITIVE

This is a continuation of application Ser. No. 603,297, filed Aug. 11, 1975, now abandoned.

BACKGROUND OF THE INVENTION

1. Field of the Invention

This invention relates to multipurpose oil-soluble additives for lubricating oils having utility to impart to an oil when incorporated therein an improved viscosity index and/or metal-wear protection and/or sludge dispersancy and/or a lowered pour point. More particularly, this invention relates to additives for lubricating oils which comprise the reaction products: of nitrogen compounds having one or more amino groups; of oxygen compounds having one or more hydroxyl, epoxide or ether groups; and/or, sulfur compounds; and/or hydrogen; with alternating interpolymers of monomers comprising: (A) one or more polar monomers; (B) one or more monoolefins or diolefins; and (C) a monomer similar to (A) and (B) but containing a reactive group that reacts with said nitrogen, oxygen or sulfur compounds or hydrogen.

2. Prior Art

Extensive work on the preparation of nitrogen derivatives of polymeric materials and on the preparation of alternating copolymers of polar and olefinic monomers has been reported in the patent literature. For example:

U.S. Pat. No. 3,316,177 discloses the reaction of a polyamine with the reaction product of maleic anhydride with an oxidized copolymer of ethylene and propylene, as a sludge dispersant in fuels and lubricants.

U.S. Pat. No. 3,404,091 describes the preparation of nitrogen containing polymers, useful as sludge dispersants and viscosity index improvers, by grafting polar monomers such as acrylonitrile onto hydroperoxidized copolymers of ethylene and propylene.

U.S. Pat. No. 3,404,092 describes the preparation of polymeric viscosity index improvers containing urethane groups by the reaction of a hydroxylated copolymer of ethylene and propylene with an isocyanate.

U.S. Pat. No. 3,687,905 describes the preparation of additives for fuels and lubricants by the reaction of maleic anhydride with a degraded, oxidized copolymer of ethylene and propylene, followed by reaction with a polyamine.

British Pat. No. 983,040 describes the preparation of detergent additives for lubricants by the reaction of a polyamine with a long-chain monocarboxylic acid prepared by the oxidation of an olefin polymer.

British Pat. No. 1,172,818 describes the preparation of additives for lube oils by the condensation of an amine with an ozonized polymer.

Copolymers of alkyl acrylates with halogen-containing monomers are old in the art. For example, copolymers of ethyl acrylate with from 2.5 to 5% of 2-chloroethyl acrylate or 2-chloroethyl vinyl ether have been available commercially as Lactoprene EV since 1944. Similar copolymers of alkyl acrylates with vinyl chloroacetates are disclosed in U.S. Pat. No. 3,201,373.

U.S. Pat. Nos. 3,183,217; 3,278,503; and 3,426,005 describe the preparation of alternating interpolymers from polar and olefinic monomers using Lewis acid-peroxide catalyst systems.

Numerous other patents disclose alternating interpolymers utilizing olefinic monomers including:

U.S. Pat. No. 3,578,636 discloses the preparation of alternating interpolymers of an olefin or halogenated olefin with an acrylic acid or haloalkylester of acrylic acid;

U.S. Pat. No. 3,629,215 discloses alternating interpolymers of alpha olefins, halo-olefins and alpha or beta substituted acrylic compounds; and, U.S. Pat. No. 3,635,924 describes the preparation of copolymers from halo-olefins and acrylic compounds; (also U.S. Pat. Nos. 3,578,636; 3,629,215; 3,635,924; 3,637,611; 3,647,771; 3,700,647; 3,700,648; 3,752,788; 3,814,735).

U.S. Pat. No. 3,856,685 discloses interpolymers of propylene and/or isobutylene with an acrylic compound which have utility as a viscosity index improver for lubricating compositions.

Relevant pending patent application filed by common assignee to this application include:

U.S. patent application Ser. No. 383,093 filed July 7, 1973 now U.S. Pat. No. 3,926,925 discloses interpolymers containing one or more branched monoolefins or vinyl ethers, a polar monomer such as an alkyl acrylate and a minor amount of a derivative of fumaric acid or maleic acid;

U.S. patent application Ser. No. 452,969 filed Mar. 20, 1974 abandoned in favor of a C.I.P. application now issued as U.S. Pat. No. 3,959,225 discloses interpolymers of an olefin and/or halo-olefin, an acrylic or alicyclic ester of acrylic acid and a minor amount of a conjugated diolefin; and, U.S. patent application Ser. No. 459,865 filed Apr. 11, 1974 now abandoned in favor of C.I.P. application Ser. No. 650,974 discloses interpolymers of monoolefins, acrylic acid esters and halomethylated aromatic vinyl compounds. This application has now issued as U.S. Pat. No. 4,026,809.

SUMMARY OF THE INVENTION

In distinction to the products and processes of the prior art, which in the case of the alternating copolymers cited are primarily directed to the production of oil-resistant, cross-linkable elastomers, it has been found that oil soluble, gel-free reaction products of nitrogen compounds having one or more amino groups or oxygen compounds having one or more hydroxyl, epoxide or ether groups and/or sulfur compounds including those having one or more sulfur oganic linkages and/or hydrogen with alternating interpolymers obtained from monomers comprising (A) one or more polar monomers; (B) one or more olefins or conjugated or non-conjugated diolefins; and (C) a monomer similar to (A) and (B) but containing a reactive group that reacts with said nitrogen or oxygen or sulfur compounds or hydrogen are useful in lubricating oil compositions, imparting to said compositions a plurality of improved qualities including viscosity index, sludge dispersancy, metal protection and pour point depressing. These alternating interpolymers are readily prepared with the aid of a catalyst system comprising a Lewis acid, a free radical source preferably an active-oxygen compound, and optionally a vanadium compound cocatalyst.

This invention teaches useful oil-soluble multipurpose additive compositions, which comprise the reaction products of: nitrogen compounds having one or more amino groups, such as for example, dodecylamine, N,N-dimethyl-1,3-diaminopropane and tetraethylene pentamine; or oxygen compounds having one or more hydroxyl, epoxide or ether groups such as pentaerythritol, propylene oxide and polypropylene glycol; or sulfur compounds as $P_2S_5$, sulfur, or sulfonating reagents; or, hydrogen with alternating interpolymers comprising (A) one or more conjugated polar monomers such as for example: dodecyl acrylate, tetradecyl maleimide and dodecylvinyl ketone; (B) one or more olefins or conjugated or non-conjugated diolefins such as for example: isobutylene, butadiene and 3,7-dimethyl-1,6-octadiene, and (C) a monomer similar to (A) and (B) but containing a reactive group that reacts with said hydrogen or nitrogen, oxygen and sulfur compounds such as for example: 2-chlorethyl acrylate; N-(2-bromoethyl) maleimide; fumaryl chloride; 3- and/or 4-chloromethyl styrene; 1-vinyl-4-chloromethyl cyclohexane; maleic anhydride; mthyl thiol acrylate; acryloyl chloride, allylchloride; vinyl chloride; and 2,6-dichlorostyrene.

Alternating interpolymers which are particularly useful for reaction with, for example, the said nitrogen, oxygen and sulfur compounds to form the novel compositions of this invention may be illustrated for the particular case where (A) is dodecylacrylate, (B) is isobutylene; and (C) is chloromethyl styrene as having the following structure for major segments of the polymer chain:

The ratio of (C) to (B) depends upon the monomer starting ratios. The exact molecular weight of these interpolymers can not be determined with certainty due to deficiencies with the analytical methods available at the present time, however, the range desired is from about 700 to 250,000 number average molecular weight ($\overline{M}n$) as determined by vapor phase osmometry (VPO) and membrane osmometry.

DESCRIPTION OF THE PREFERRED EMBODIMENTS

I. Monomers

A. Polar Monomers

Polar monomers suitable for the practice of this invention are monoethylenically unsaturated conjugated esters, ketones or nitriles having from 3 to 30 carbons and may be represented by the general formula: $Q(R_1)C=C(R_2)Q'$ wherein $R_1$ and Q are hydrogen and $R_2$ is independently selected from the group consisting of hydrogen and a $C_1$ to $C_{24}$ alkyl radical, such as methyl (—$CH_3$) and Q' is independently selected from the group consisting of cyano (—CN); ketone

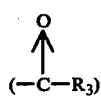

and ester

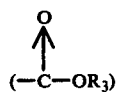

wherein $R_3$ is selected from the group consisting of $C_1$ to $C_{30}$ straight and branched chain alkyl, arylalkyl and cycloalkyl radicals. Non-limiting examples of suitable polar monomers include: acrylonitrile, methacrylonitrile; $C_1$ to $C_{30}$ straight and branched-chain alkyl, arylalkyl and cycloalkyl acrylates and methacrylates of which ethyl acrylate, isopropyl acrylate, methyl methacrylate, 2 ethyl hexyl acrylate, dodecyl acrylate, tetradecylmethacrylate, phenyl vinyl ketone and dodecylvinyl ketone are non-limiting examples.

Preferred among these polar monomers are conjugated compounds having the formula:

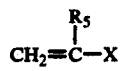

wherein X is a nitrile group or a group of the formula

wherein Y is a $ZR_6$, —$NR_4R_5$ or $R_4$ with Z being an oxygen or sulfur atom; wherein $R_4$ and $R_5$ are individually a hydrogen atom or an organic residue having 1 to 24 carbon atoms or collectively an alicyclic organic structure, wherein $R_6$ is an organic residue having 1 to 24 carbon atoms.

Even more preferred are those polar monomers of the class having the formulae:

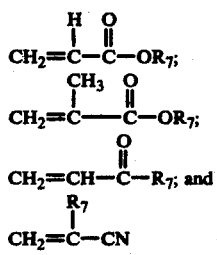

where $R_7$ is an alkyl group having from 4 to 24 carbons and mixtures thereof.

The polar monomer (including its derivative) generally as noted constitutes about 50 mol percent of the interpolymer, however, if from about 2/1 to 10/1 molar ratio of A/B is present during polymerization the polar monomer content of the alternating interpolymer can be increased to from about 60 to 75 mol percent. Included also are a carbonyl or thiocarbonyl containing non-conjugated, unsaturated compound having the formula:

wherein Z is an oxygen or sulfur atom; Y is an oxygen or sulfur atom or a —$N(R_{15}R_{16})$ group, $R_{14}$ is a hydrocarbon residue having 1–20 carbon atoms; $R_{15}$ is a polymerizable terminally unsaturated hydrocarbon residue having 2 to 20 carbon atoms; and $R_{16}$ is a hydrogen atom or hydrocarbon residue having 1 to 20 carbon atoms; e.g., vinyl acetate, vinyl propionate, vinyl-2-ethyl hexane carboxylate, vinyl stearate, allyl laurate, vinyl norbornene-2-carboxylate, γ-methyl allyl acetate, etc.

B. Olefinic Monomers

The olefinic monomers generally are selected from the group consisting of (1) a terminal unsaturated olefinic compound having the formula:

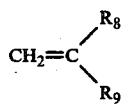

wherein $R_8$ and $R_9$ are individually hydrogen, alkoxy, or a hydrocarbon residue having 1 to 20 carbon atoms, e.g. butene-1, hexene-1, α-butylstyrene, isobutylene, etc. (2) an internal olefinic compound having the formula:

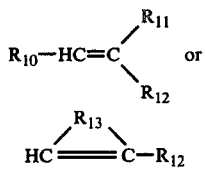

wherein $R_{10}$ and $R_{11}$ are individually a hydrocarbon residue having 1 to 20 carbon atoms, $R_{12}$ is a hydrogen or hydrocarbon residue having 1 to 20 carbon atoms and $R_{13}$ is a cyclic hydrocarbon residue having 1 to 20 carbon atoms, e.g. butene-2, octadecene-2, β-methylstyrene, 5-phenylnorbornene, etc.

Olefinic monomers which are preferable for the practice of this invention include $C_2$ to $C_{30}$ olefins having a Type I structure R—CH═$CH_2$ and Type III structure R'(R")C═$CH_2$ wherein R, R' and R" have from 1 to 18 carbon atoms and are independently selected from the group consisting of hydrogen, straight and branched chain alkyl, aryl; alkylaryl, arylalkyl, and cycloalkyl.

Non-limiting examples of Type I olefins include; ethylene, propylene; 1-butene; 1-pentene; 1-hexene; 4-methyl-1-pentene; 4,4-dimethyl-1-pentene; 1-dodecene; 1-octadecene; styrene; 4-methyl styrene; 3-phenyl-1-propene; vinyl cyclohexane; 2-vinyl norbornene; vinyl naphthalene, 2-methyl-1-eicosene, etc.

Non-limiting examples of suitable Type III olefins include: isobutylene; 2,3-dimethyl-1-butene; 2,4,4-trimethyl-1-pentene; 2,6-dimethyl-1-octene; 4-isopropenyl toluene; isopropenyl cyclohexane, α-methyl styrene, etc. Preferred are the $C_3$ to $C_6$ olefins such as propylene, isobutylene and 1-butene.

C. Reactive Monomer Similar to A and B Reactive with Elemental Hydrogen, Nitrogen, Oxygen and/or Sulfur Compounds For purposes of this disclosure these derivatives are characterized by the presence of one or more groups chemically reactive with hydrogen or nitrogen, oxygen or sulfur compound which remain after polymerization of the interpolymer and provides for intramolecular attachment of the nitrogen, oxygen and/or sulfur compound onto the alternating polymer.

Such chemically reactive groups include an unsaturated alkyl group, hydroxy, carboxyl, thiol, carbonyl, thionyl, amido, imino, acyl halide, halo, dicarboxylic acid anhydride, thiolic anhydride, thionic anhydride, dithionic anhydride, disubstituted amino, trisubstituted amino, ureido, isourea and dicarboxylamic acid anhydride (—C═C—). Thus the reactive derivative can be represented by the general formula

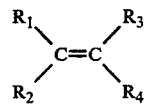

wherein $R_1$ is hydrogen, $R_3$ is hydrogen or a $C_1$ to $C_{30}$ alkyl radical and $R_2$ is hydrogen or $R_4$ and $R_4$ is selected independently from the group consisting of $C_1$ to $C_{30}$ straight and branched chain alkyl, arylalkyl, cycloalkyl, alkenyl, arylalkenyl and cycloalkenyl moieties and/or one or more reactive groups of the class consisting of alkyl unsaturation, carboxyl, epoxide, thiol, carbonyl, isocyanate, thionyl, amido, hydroxy, imino, acylhalide, halo, dicarboxylic acid anhydride, thiolic anhydride, thionic anhydride, dithionic anhydride, disubstituted amino, trisubstituted amio, ureido, isourea and dicarboxylamic acid anhydride or one-half of cyclic dicarboxylic acid anhydrides as in maleic anhydride or one-half of cyclic thiolic anhydride or one-half of cyclic thionic anhydride or one-half of cyclic dithionic anhydride or one-half of cyclic dicarboxylic amic acid anhydride or one-half of cyclic N $C_{1-18}$ hydrocarbyl imides such as N-dodecylmaleimide. Non-limiting examples include: α-chloroacrylonitrile; 2-chloroethyl acrylte; (β-chlorallyl) acrylate; (2-ethoxyethyl) acylate; acrylamide; thioacrylamide; N-n-octylacrylamide; N-n-dodecyl-acrylamide; N-acryloylmorpholine; acryloyl chloride, acrylic acid; thioacrylic acid; thionacrylic acid; ammonium acrylate; acrolein; ethyl vinyl ketone; 1-chloro-butyenyl-ethyl ketone; vinyl chloride; 4,4,4-trichlorobutene-1; p-chloroallyl-benzene; p-(chloromethyl)styrene; 4-chloro-1-vinyl naphthalene; vinylidene chloride; 1-chloro-1-benzyl ethylene; α-ethyl-m(trichloromethyl)styrene; methyl crotonate; allyl benzene; methyl isopropenyl ketone; maleic anhydride; fumaryl chloride, maleimide and n-octyl maleimide.

A commercially available mixture of the 3- and 4-isomers of chloromethyl styrene is sold as VBC (vinyl benzyl chloride) by Dow Chemical Co., Midland, Michigan.

Non-limiting examples of conjugated diolefins which may be interpolymerized with the polar and olefinic monomers include: butadiene, isoprene, cis and trans piperylene; 2,3-dimethyl-1,3-butadiene; 1,3-hexadiene; 3,7-dimethyl-1,3-octadiene and 3-(4-methylpentyl)-1,3-butadiene.

Non-limiting examples of non-conjugated diolefins include: 1,4-hexadiene; 3,7-dimethyl-1,6-octadiene; 4-vinyl cyclohexene; 1-allyl-4-isopropylidene cyclohexane; and 5-vinyl norbornene.

D. Polymers

Polymers of olefins and polar monomers are not necessarily oil soluble, for example, an alternating copolymer of isobutylene and methyl acrylate is not oil soluble. Therefore, since oil solubility is a necessity for the practice of this patent, the presence of long chain alkyl groups is essential to provide oil solubility. At least one of (A) or (B) must contain the alkyl group. In the case of the polar monomer there can be a long chain alkyl on the same carbon as the polar group or it can be on the polar group itself such as an ester, ketone, or amine. Likewise the olefin can have a long chain alkyl group. It is not necessary that both monomers contain this group. Oil solubility can be obtained by alkyl chain mixtures such as some $C_4$ and some $C_{20}$ and there is no specific chain length that can be specified since each set of monomers has its own specific needs. We do specify, however, in each case that the alkyl chain be long enough to provide adequate oil solubility for the purposes of this invention.

Preparation of Interpolymers

II. Catalysts

Catalyst compositions suitable for the practice of this invention comprise, in combination, a Lewis acid and a source of free radicals. Preferred Lewis acids are metal halides and alkyl aluminum halides and preferred sources of free-radicals are organic peroxy compounds and azo compounds. In addition to the Lewis acid reagent and peroxy compound, cocatalysts, particularly vanadium compounds, may optionally be used to enhance and direct the activity of the catalyst system.

Non-limiting examples of Lewis acids which are suitable for the practice of this invention include: aluminum trichloride, aluminum tribromide, aluminum triiodide, hydrofluoric acid, boron trichloride, boron trifluoride, ferric chloride, stannic chloride, zinc chloride, zirconium tetrachloride, and organoaluminum halides having the general formula $AlR_mX_n$ wherein R is a monovalent hydrocarbon radical selected from the group consisting of $C_1$ to $C_{12}$ alkyl, aryl, alkylaryl, arylalkyl and cycloalkyl radicals, m is a number from 1 to 3, X is a halogen selected from the group consisting of chlorine, bromine and iodine, and the sum of m and n is 3. Preferred are ethyl aluminum sesquichloride, $Et_{1.5}AlCl_{1.5}$ and ethyl aluminum dichloride, $EtAlCl_2$.

Useful cocatalyst vanadium compounds have the general formula $VO_zX_t$ wherein z has a value of 0 to 1, t has a value of two to four, and X is independently selected from the group consisting of chlorine, bromine, iodine, acetylacetonates, haloacetylacetonates, alkoxides and haloalkoxides. Non-limiting examples include $VCl_4$, $VOCl_3$, $VO(OEt)_3$, $VOCl_2(OBu)$, $V(AcAc)_3$, $VO(AcAc)_2$, and $VOCl_2(AcAc)$ where (AcAc) is an acetylacetonate.

While free-radical generators such as ultra-violet light and high-energy radiation may be used as the source of free-radicals in the catalyst system of this invention, preferred are organic peroxides, hydroperoxides, peracids, peroxyesters and azo compounds. Non-limiting examples include benzoyl peroxide; acetyl peroxide; lauroyl peroxide; t-butyl peroxide; t-butyl peracetate; t-butyl peroxypivalate, cumene hydroperoxide; 2-methyl pentanoyl peroxide, dicumyl peroxide and 2,2'-azo bis(isobutyronitrile).

The concentration of the individual catalyst components may be varied over a wide range depending on the reactivity of the individual monomers. Suitable mol ratios of polar monomer to organoaluminum halide, for example, may range from 1 to 2000 moles of polar monomer per mol of organoaluminum halide or higher. Preferred is a ratio of 5 to 1500 mols of polar monomer per mol of organoaluminum halide. Most preferred is a ratio of from about 10 to 1000 mols of polar monomer per mol of organoaluminum halide.

The peroxide component is similarly variable over a wide range of mol ratios. Suitable ratios range from 10 to 2000 mols of polar monomer per mol of peroxide or azo compound. Preferred is a ratio of from about 20 to 1000. Most preferred is a ratio of from 30 to about 500 moles of polar monomer per mol of the free radical generator.

As indicated above, a vanadium cocatalyst may optionally be used to enhance the activity and selectivity of the principal catalyst system. When used, the vanadium compound may be added to the catalyst system in the range of from 1 to about 100 mols of organoaluminum halide per mol of vanadium compound. Preferred is a range of from 2 to 50. Most preferred is a molar ratio of from about 3 to 30 mols of organoaluminum halide per mol of vanadium compound.

III. Solvents

Suitable media for dissolving or dispersing the monomers, catalyst components and polymeric reaction products include the general group of aliphatic and aromatic petroleum hydrocarbons and halogenated hydrocarbons. Acyclic or alicyclic $C_8$ or lower straight or branched chain saturated hydrocarbons and aromatic hydrocarbons are preferred. $C_1$ to $C_8$ halogenated hydrocarbons are also useful solvents. Choice of a particular solvent or mixture of solvents will depend on the process conditions, e.g. whether a homogeneous solution process, suspension or slurry process, or cement suspension process is used.

In a homogeneous solution process for the production of high-molecular weight polymers, the concentration of polymer in the cement is usually limited to the range of 5 to 10 weight percent since higher concentrations require excessive power input to insure good mixing, efficient heat-exchange is difficult to achieve and the high viscosity of the solution at the temperatures which are usually employed during the polymerization reaction causes sticking and fouling of the reactor with the reaction products.

In a slurry process in which the monomers and catalyst components are soluble in the solvent, but in which the polymer is not, higher concentrations of dispersed polymer in the range of 10 to 20 wt. percent may be attained. Similar concentrations may be handled in reactors equipped with conventional mixers in a cement-suspension process in which a single or mixture of solvents is chosen which yields two phases; a dispersed cement phase of polymer swollen with monomers and solvent and a continuous phase consisting essentially of the pure solvent containing a small amount of monomers. Any of the above solvent systems may be used in batch, semi-continuous or fully continuous processes.

Non-limiting examples of suitable solvents which may be used alone or in admixture include: butane; pentane; cyclopentane; hexane; heptane; isooctane; benzene; cyclohexane; toluene; methyl cyclohexane; mixed xylenes; cumene; methyl chloride; methylene chloride; dichloroethane; orthodichlorobenzene and fluorinated or chlorfluorinated $C_2$ to $C_4$ acyclic hydrocarbons. Solvents which are known to form stable complexes or coordination compounds with any of the catalyst components, particularly the Lewis acid, or vanadium compound if used as a cocatalyst, are undesirable and should be avoided.

IV. Process Conditions

It is in the teachings of the referenced copending U.S. patent applications: Ser. No. 383,093 filed July 27, 1973; Ser. No. 452,969 filed Mar. 20, 1974; and Ser. No. 459,865 filed Apr. 11, 1974 now abandoned and replaced by a continuation-in-part, namely Ser. No. 650,974 filed Jan. 21, 1976 that the process for preferred interpolymers used in the process of this invention are fully described and are incorporated herein by reference thereto.

The interpolymer reactants of this invention may be prepared in batch, semi-continuous or fully continuous processes in which homogeneous solution, slurry or cement suspension solvent systems are utilized.

Monomers and catalyst components in all processes, pre-diluted with solvent if desired may then be introduced into a stirred reactor, either simultaneously or sequentially, at a rate consistent with the means used for heat-exchange to maintain the desired temperature range. Pressure on the reactor is maintained at a level sufficient to keep the reactants in the liquid phase. The catalyst components may be mixed in line in the absence of monomers before they are added to the reactor, or they may be added directly to the reactor in the presence of the monomers.

Temperatures at which polymerization may be conducted may range from $-100°$ C. to $100°$ C. Preferred are temperatures in the range of $-80°$ C. to $50°$ C. Most preferred are temperatures in the range of $-40°$ C. to $40°$ C. The temperature may be varied during the time required for optimum yield and polymer properties, with for example a low temperature during the initial phase of the reaction and a higher temperature during the final phase.

Reaction time may vary widely, depending on the reactivity of the particular monomers, catalyst concentration and temperature of the reaction. Generally, reaction times are shorter at higher monomer, organoaluminum and peroxide concentrations and at higher polymerization temperatures. Accordingly, polymerization times may vary from as little as two minutes to 200 hours. Preferred are reaction times in the range of from 10 minutes to 24 hours. Most preferred are reaction times in the range of 15 minutes to 10 hours.

Isolation of the interpolymer at the completion of the reaction may be accomplished in a variety of ways. In a preferred embodiment, the homogeneous polymer cement solution, or polymer suspension, or polymer cement suspensions is fed from the reactor in the case of a batch process, or final reactor or holding drum in the case of a semi-continuous or fully continuous process to a mixing drum where the reaction mixture is mixed either in line or is mixed in the drum with a quantity of a lower alcohol such as methanol, ethanol or isopropanol in order to inactivate the catalyst mixture. The alcohol may optionally contain a sequestering reagent such as ethylene diamine tetraacetic acid or its disodium salt or acetylacetone. While inactivation of the catalyst in the manner indicated is preferred it is not essential and may be omitted if desired.

The polymer solution or suspension, with or without catalyst inactivation is fed to an agitated wash drum where it is mixed with water or a dilute aqueous solution of an acid such as hydrochloric or sulfuric acid in order to deash the polymer.

Final recovery of the interpolymer in a form in which it may readily be reacted with the nitrogen, oxygen, etc. coreactants is accomplished by mixing the polymer solution or suspension with an amount of a refined low pour neutral oil to yield a concentration in the range of about 20 to 49 weight percent of polymer in the oil solution and the original solvent removed by stripping with steam or under vacuum. The oil solution prior to stripping may have an antioxidant added to it.

V. Post Polymerization Reactions

For the purposes of this patent we envisage that the interpolymer will be reacted with hydrogen or O, S or N compounds to form multifunctional products. For example, polyamines, such as diethylene triamine can be reacted with halogen, acid halides, isocyanate, carboxyl, ketone, anhydride, ester, acidic sulfur and epoxy interpolymer reactive groups to obtain dispersance. Likewise polyhydroxy compounds such as pentaerythritol, trimethylol propane, or polyalkenyl oxide glycols can be reacted with carboxyl acid halides, isocyanate, anhydride, epoxy and acidic sulfur polymer groups to provide dispersancy.

Likewise long chain alkyl amines or hydroxy compounds such as dodecyl alcohol or amine can be reacted as above to confer pour depressant activity on the interpolymer.

Reduction of reducible groups such as nitrile, amides, ketimines, imides, esters, carbonyls, etc. by hydrogen can be accomplished leading to amines which confer dispersant properties. This reduction can be by elemental hydrogen under catalytic conditions, temperature, and pressure or by organic hydrides, inorganic hydrides and other methods well known in the art.

Unsaturated groups can be utilized in a variety of ways. Reaction with halogens, n-halo compounds, or hydrogen halides give either vicinal halides or allylic substitution, the latter preferred due to faster reaction with example amines. These halogenated products then are converted to amines providing dispersancy.

Further reaction of unsaturation with $F_2S_5$ or sulfur or sulfonating agents is contemplated. $P_2S_5$ or sulfur adducts are known to provide antioxidant functionality. Sulfonating agents provide sulfonic acid groups which can provide detergent activity and can permit suspension for colloidal metal carbonates. Further reaction of a hydroxy polymer or a post polymerization formed hydroxy polymer can be performed with $P_2S_5$ to give acidic groups that can be reacted with zinc to form zinc dialkyl dithiophosphonates which are well known in the art to give wear protection.

VI. Coreactants

A. Nitrogen Compounds

Nitrogen compounds having one or more amino groups which are useful for reaction with the alternating interpolymers of this invention include mono- and polyamines of about 2 to 60, e.g. 3 to 20 total carbon atoms and about 1 to 12, e.g. 2 to 6 nitrogen atoms in the molecule. The amine compounds may be hydrocarbonyl amines or may include hydroxy groups, alkoxy groups, amide groups or may be cyclic in structure such as imidazolines and the like. Preferred amines are aliphatic, saturated amines, including those of the general formulae:

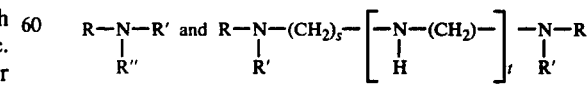

wherein R, R' and R" are independently selected from the group consisting of hydrogen; $C_1$ and $C_{12}$ straight or branched chain alkyl radicals; $C_1$ to $C_{12}$ alkoxy $C_2$ to $C_6$ alkylene radicals; $C_2$ to $C_{12}$ hydroxy or amino alkylene radicals; and $C_1$ to $C_{12}$ alkylamino $C_2$ to $C_6$ alkylene radicals; s is a number of from 2 to 6, preferably 2 to 4; and t is a number of from 0 to 10, preferably 2 to 6.

Non-limiting examples of suitable amine compounds include: mono-, di- and tri-tallow amines; 1,2-diaminoethane; 1,3-diaminopropane; 1,4-diaminobutane; 1,6-diaminohexane; diethylene triamine; triethylene tetramine, tetraethylene pentamine, 1,2-propylene diamine, di (1,2-propylene) triamine, di-(1,3-propylene) triamine, N,N-dimethyl-1,3-diaminopropane; N,N-di-(2-aminoethyl) ethylene diamine, N,N-di-(2-hydroxyethyl)-1,3-propylene diamine; 3-dodecyloxypropylamine; N-dodecyl-1,3-propane diamine; tris-hydroxymethyl methylamine, diisopropanol amine, and diethanol amine.

Other useful amine compounds include: alicyclic diamines such as 1,4-bis-(aminomethyl) cyclohexane, and heterocyclic nitrogen compounds such as imidazolines and N-aminoalkyl piperazines of the general formula:

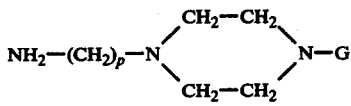

wherein G is independently selected from the group consisting of hydrogen and Ω aminoalkylene radicals of from 1 to 3 carbon atoms; and p is an integer of from 1 to 4. Non-limiting examples of such amines include 2-pentadecyl imidazoline; N-(2-aminoethyl) piperazine; N-(3-aminopropyl) piperazine; and N,N'-di-(2-aminoethyl) piperazine.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds having a composition approximating tetraethylene pentamine are available commercially under the trade name Polyamine 400 (PA-400), marketed by Jefferson Chemical Co., New York, N.Y. Similar materials may be made by the polymerization of aziridine, 2-methyl azirdine and azetidine.

Still other amines with amino groups separated by hetero atom chains such as polyethers or sulfides can be used.

B. Oxygen Compounds

Oxygen compounds having one or more hydroxyl, expoxide or ether groups which are suitable for reaction with either the alternating interpolymers of this invention, or with amine adducts or reaction products of the interpolymers include: $C_6$ to $C_{18}$ straight or branched-chain primary alcoholes; polyethylene or polypropylene glycols having the general formula: HO(C-$H_2$—CH(R)O)$_m$H wherein R is hydrogen or a methyl radical and m is an integer in the range of 1 to 10; oxiranes having the general formula:

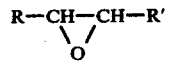

wherein R and R' and independently selected from the group consisting of hydrogen, $C_1$ to $C_{12}$ alkyl radicals and $C_6$ to $C_9$ aryl and alkylaryl radicals; polymethylol alkanes such as tris(hydroxymethyl) 1,1,1-propane and pentaerythritol and compounds having both amine and hydroxyl functionality such as tris(hydroxymethyl) methylamine.

C. Sulfur Compounds

The patent literature teaches of ashless lubricant additives obtained by treating polymers with $P_2S_5$ followed by amination with an aliphatic polyamine to improve the dispersancy and detergent properties of the lubricating oil (see U.S. Pat. Nos. 3,143,506 and 3,329,612). It is possible to similarly treat the interpolymers described herein and obtain enhanced dispersancy and detergency. Briefly the process involves reacting the polymer with a sulfurizing agent, followed by treatment of the resulting product with a hydrolyzing agent and neutralizing agent. The sulfurizing agents include phosphorus sulfides, thiophosphoryl chloride, sulfur, sulfur chloride, sulfur monochloride, alkenyl sulfenyl chloride and combinations of those with phosphorizing agents such as phosphorus chloride, phosphorus pentoxide and phosphorus. Illustrative combinations of those sulfurizing and phosphorizing agents include phosphorus pentasulfide and sulfur monochloride, sulfur and phosphorus pentachloride and sulfur monochloride and phosphorus.

The structure of these sulfur derivatized interpolymers is not fully known, however, it is commonly believed to be a mixture of different types of acids after hydrolysis including those having carbon to sulfur bonds, carbon to oxygen to sulfur bonds and carbon to sulfur to phosphorus bonds.

Neutralization can be carried out to a wide range of basicity, i.e. it can partially neutralize to the acid salt or fully neutralize to a basic salt. Representative of these extremes would be sulfonation of the salt with chlorosulfonic acid to yield an acidic metal salt and neutralization with a stoichiometric excess of barium oxide in the presence of a solvent followed by carbonation and filtration.

Neutralization of $P_2S_5$ treated hydroxy polymers by zinc oxide yield polymeric load carrying agents and antioxidants.

VII. Condensation of Interpolymer with Coreactants

When preparation of the interpolymer is complete and it has been dissolved in an oil by solvent exchange, the solution is transferred to a stirred reactor for further reaction with the nitrogen, oxygen or sulfur compound. During the reaction, the reaction mixture is protected from the atmosphere by blanketing the reactor with an inert gas such as nitrogen and sparging with nitrogen during the reaction period.

Reaction takes place readily at a temperature in the range of about 0° C. to 250° C.; preferably 100° C. to 200° C. Time of reaction varies from 15 minutes to 24 hours, preferably from 1 hour to 4 hours. These reactions as earlier noted are well known in the art as is the hydrogen reaction which was earlier discussed.

In order to avoid a hazy product the presence of an excess of the coreactant, especially in the case of an amine compound, will be avoided, otherwise intensive stripping at an elevated temperature with nitrogen or high vacuum distillation is required to remove the unreacted amine from the reaction mixture. Thus, when reacting the alternating interpolymer with the coreactant, an amount of coreactant will be used which is less than the stoichiometric quantity. The stoichiometric quantity is defined herein as that quantity of coreactant which will react with the interpolymer, above which will result in a hazy oil. Accordingly, the quantity of coreactant which is reacted with the interpolymer will be in the range of about 1 to 99 percent, preferably 5 to 95 percent of the stoichiometric amount.

The multipurpose lubricating oil additives of the invention have a number average molecular weight ($\overline{M}n$) as determined by vapor phase osmometry (VPO) or membrane osmometry of from about 700 to 250,000, preferably from about 10,000 to 100,000; have a nitrogen content due to reactive compounds ranging up to about 10 wt. %, preferably from 0.01 to 8 wt. %; and have a sulfur content of 0.01 up to about 5 wt.% when sulfur is incorporated therein; said nitrogen and sulfur wt. % content calculated upon its weight in the intramolecularly attached groups relative to the total weight of the multifunctional interpolymer additive.

The oil-soluble polymeric reaction products of this invention can be incorporated in lubricating oil compositions, e.g. automotive or diesel crankcase lubricating oil, in concentrations in the range of about 0.01 to 20 weight percent, e.g. 0.1 to 15 weight percent, preferably 0.25 to 10.0 weight percent of the total composition. The products of this invention are useful additives not only for hydrocarbon lubricants derived from petroleum but also include synthetic lubricants such as: alkyl esters of dibasic acids; complex esters made by the esterification of dibasic acids, polyglycols, monobasic acids and alcohols; esters of carbonic and phosphoric acids; carboxylic esters of polyglycols; etc.

Concentrates of the products of this invention which may range from about 20 to 49 weight percent in oil may also contain other conventional additives such as dyes, antioxidants and other viscosity-index improvers, anti-wear agents, pour point depressants, dispersants and the like.

The invention will be further understood by reference to the following examples which include preferred embodiments.

EXPERIMENTAL

EXAMPLE 1 — Preparation of an interpolymer of Dodecyl Acrylate, Isobutylene and VBC (Polymer A)

The polymerization was carried out in a pressure vessel fabricated from a solid cylinder of polypropylene which had been bored to create a cylindrical cavity of 800 ml. The vessel was sealed by means of a threaded cap and an oil-resistant "O" ring fashioned from an NBR rubber.

The polymerization vessel, contained in a dry-box from which air and moisture were excluded by means of a positive internal pressure of oxygen-free and moisture-free nitrogen, was charged with 300 ml. of toluene which had been purified by percolation through a column of Linde 3A molecular sieves, 120 grams (0.5 mol) of a commercial grade of dodecyl acrylate containing 15 ppm of 4-methoxyphenol as an antioxidant and 15.3 grams (0.1 mol) of a commercial grade of chloromethyl styrene having an isomer distribution of about 60% of the 3- isomer and about 40% of the 4- isomer, hereinafter designated VBC (commercially designated as vinyl benzyl chloride).

The pressure vessel was then immersed in a trichlorofluoromethane bath maintained at $-20°$ C., located in the dry box and the vessel and contents cooled to $-15°$ C. There was then added to the vessel in succession 7.5 ml. of a 1.0 molar solution of ethyl aluminum sesquichloride ($Et_{1.5}AlCl_{1.5}$) in purified n-heptane, 56 grams (1.0 mol) of liquefied isobutylene and 1 millimol of lauroyl peroxide dissolved in 20 ml of purified toluene. The reaction vessel was sealed, removed from the bath and allowed to come to room temperature over about 1 hour.

The reaction vessel was then placed in a tumbling water bath maintained at 32° C. and tumbled for a period of 30 hours. The pressure vessel contents were then transferred to a flask and the reaction terminated by the addition of 15 ml. of isopropyl alcohol and 10 ml. of methanol.

An aliquot of the solution was removed for analysis and added to boiling water whereupon the interpolymer precipitated as a slurry. The polymer was filtered from the water and dried in a vacuum oven for 4 hours at 60° C. at a pressure of 20 torr. The polymer had an inherent viscosity of 0.55 when determined in toluene at a concentration of 0.1 g/dl at 25° C., a chlorine content of 0.93 wt. % and when examined by NMR in $CCl_4$ solution at 60 MHZ showed the monomer distribution in the polymer to be dodecyl acrylate 55 mol %; isobutylene 40 mol %; and vinyl benzyl chloride 5 mol %. The structure of the interpolymer was determined by using the chemical shifts at 7.0 ppm as a measure of aromatic protons, the chemical shift at 4.5 ppm for the $-CH_2Cl$ group and the $-OCH_2-$ signal at 3.95 ppm for the ester.

The remainder of the inactivated toluene-heptane solution of the interpolymer was added to a quantity of a low-pour, solvent extracted Mid-continent neutral oil having a viscosity of 100 SUS at 37.8° C. to give a 30 wt. % solution after the solvents were removed by steam distillation and the oil solution dried by blotter pressing. Reaction of this solution with an amine compound to yield an exemplar of the products of this invention is described in Example 4.

EXAMPLE 2 — Polymer B

Using the same equipment and procedure as was used in Example 1, an interpolymer was prepared from dodecyl acrylate, isobutylene and VBC. The interpolymer had an inherent viscosity of 0.60 when determined in toluene at a concentration of 0.1 g/dl at 25° C. and a chlorine content of 0.81 wt. %. The deashed polymer was dissolved in the same neutral oil used in Example 1 to give a 25 wt. % solution. Reaction of this solution with several amine compounds is described in Example 5,6 and 7.

EXAMPLE 3 — Polymer C

Using the same equipment and procedure as was used in Example 1, an interpolymer was prepared from dodecyl acrylate, isobutylene and VBC. The interpolymer had an inherent viscosity of 0.89 when determined in toluene at a concentration of 0.1 g/dl at 25° C. and a chlorine content of 0.81 wt.%. The deashed polymer was dissolved in the same neutral oil as was used in Example 1 to give 25 wt. % solution. Reaction of this solution with several amine compounds is described in Examples 8 and 9.

EXAMPLE 4

Ten grams of the interpolymer oil solution of Example 1 was mixed in a beaker with 0.200 grams of N,N- dimethyl-1,3-diaminopropane under an atmosphere of nitrogen at 150° C. for 3 hours. The mol ratio of amine compound to the gram atoms of chlorine present in the oil solution was 0.027. A clear, gel-free solution was obtained.

EXAMPLE 5

Ten grams of the oil solution of Example 2 was mixed with 0.205 wt. % of a poly(ethylene diamine) available commercially as PA-400 with a molecular weight of 210 and heated with stirring under an atmosphere of nitrogen at 150° C. for 3 hours. The mol ratio of amine to available chlorine was 0.17. The resultant aminated interpolymer when subjected to the zinc precipitation haze test had a transmittance of 92% compared to the blank oil.

Zinc Haze Precipitation Test (ZHPT)

The ZHPT is based on the observation that a zinc dialkyl dithiophosphate reagent when heated with an oil solution containing free amine will interact with the amine and precipitate giving rise to a visual haze. The reagent is prepared by reacting a mixture of 65 wt. % of isobutyl alcohol and 35 wt. % of mixed primary amyl alcohols with $P_2S_5$ and neutralizing the reaction mixture with zinc oxide. A 75 wt. % solution of the zinc dialkyl dithiophosphate is prepared in a light mineral oil as a stock solution. The test is carried out by making 10 parts by weight of the aminated interpolymer oil solution with 1 part by weight of the stock solution and 89 parts by weight of a highly refined, acid-treated U.S.P. white mineral oil and heating the mixture for 3 to 24 hours at 82° C. During the heating period the percentage of the incident light transmitted through the sample is measured by means of a photocell nephelometer. Values of more than 35% are considered hazy and do not pass.

EXAMPLE 6

Ten grams of the oil solution of Example 2 was mixed with 0.22 wt. % of N,N-dimethyl-1,3-diaminopropane (DMPDA) and heated with stirring under an atmosphere of nitrogen at 150° C. for 3 hours. The mol ratio of amine to available chlorine was 0.03. The resultant aminated interpolymer when subjected to the ZHPT was perfectly clear and free of any haze.

EXAMPLE 7

Ten grams of the oil solution of Example 2 was mixed with 0.102 wt. % of PAM-400 and heated with stirring under an atmopshere of nitrogen at 150° C. for 3 hours. The mol ratio of amine to available chlorine was 0.102. The resultant aminated interpolymer when subjected to the ZHPT showed a transmittance of 67% at the end of 20 hours.

EXAMPLE 8

Ten grams of the oil solution of Example 3 was mixed with 0.21 weight percent of DMPDA and heated with stirring under an atmosphere of nitrogen at 150° C. for 3 hours. The mol ratio of amine to chlorine was 1.54. The resultant aminated interpolymer when subjected to the ZHPT gave a perfectly clear, haze-free solution.

EXAMPLE 9

Ten grams of the oil solution of Example 3 was mixed with 0.103 weight percent of PAM-400 and heated with stirring under nitrogen at 150° C. for 3 hours. The mol ratio of amine to available chlorine was 0.46. The resultant aminated interpolymer when subjected to the ZHPT had a transmittance of 66 percent at the end of 20 hours.

EXAMPLE 10

The aminated product of Example 8 was tested in a low-ash formulation for varnish inhibition by the following comparative procedure. Two one gram samples of lubricating oil (one sample containing about 0.2 gram of the product of Example 8 and the other only the oil) were each admixed with 9 grams of a commercial lubricating oil obtained from a taxi after 2000 miles of driving with said lubricating oil. Each 10 gram sample was heat soaked over night at about 140° C. and thereafter centrifuged to remove the sludge.

The supernatant fluid of each sample was subjected to heat cycling from about 115° C. to room temperature over a period of 3½ hours at a frequency of about 2 cycles/minute. During the heating phase a gas containing a mixture of about 0.7 volume % $SO_2$, 1.4 volume % NO and balance air was bubbled through the test samples and during the cooling phase water vapor was bubbled through the test samples. At the end of the test period which testing cycle can be repeated as necessary to determine the inhibiting effect of any additive, the wall surfaces of the test flasks in which the samples were contained are visually evaluated as to the varnish inhibition.

The results showed a significant reduction in varnish deposition in the wall of the flask containing the product of Example 8 relative to the flask containing the same oil without the aminated interpolymer.

While the above examples show only the use of amine compounds as co-reactants, equally favorable additives may be prepared with the types of oxygen compounds listed herein. Of particular utility are oxygen derivatives of amine reactants with the interpolymers prepared by the reaction of the aminated interpolymer with ethylene oxide or propylene oxide. The reaction of these oxiranes with the aminated interpolymer is useful for improving the resistance of the additive to the development of haze in those instances where free amino groups or traces of unreacted amine are present in the aminated interpolymer.

The additive products of the invention have been illustrated by the reaction of the defined interpolymers with nitrogen and/or oxygen containing reactants whereby the additional additive functionality is supplied to the interpolymers—which are useful viscosity index improvers for lubricating oils. This additional additive functionality to the interpolymers according to this invention could be achieved by selection of one or more interpolymer monomers which contain the desired additive functional group, e.g. N(3-dimethylaminopropyl)-maleimide could be used as the polar monomer.

The invention in its broader aspect is not limited to the specific details shown and described and departures may be made from such details without departing from the principles of the invention and without sacrificing its chief advantages.

What is claimed is:

1. A composition comprising a major proportion of lubricating oil and dissolved therein as an additive 0.01 to 49 wt.% of an oil soluble, sludge dispersing, polymer having a nitrogen content in the range of about 0.01 to 8 wt. %, which is the reaction product of: a hydrocarbyl amine of 2 to 60 carbon atoms and 1 to 12 nitrogen atoms having at least one primary amine group, which hydrocarbyl amine may be substituted with hydroxy groups, with an oil soluble chlorine-containing alternating interpolymer having a number average molecular weight in the range of about 700 to 250,000 consisting essentially of about equimolar proportions of (a) an ester which is a $C_1$ to $C_{30}$ alkyl acrylate or methacrylate, and (b) an olefin mixture consisting essentially of a major molar amount of a $C_2$ to $C_{30}$ monoolefin of the formula $R-CH=CH_2$ and/or $R'(R'')C=CH_2$ where R, R' and R'' are hydrogen or alkyl groups, and a minor molar amount of vinyl benzyl chloride; wherein 5 to 95 mole % of said chlorine in said interpolymer will react with said amine to thereby give said nitrogen content, and wherein said alternating interpolymer is prepared by copolymerizing said ester and olefin mixture in the presence of a catalyst comprising a mixture of a Lewis acid catalyst and a free radical catalyst selected from the group consisting of peroxide and azo catalysts, whereby said ester alternates with either said $C_2$ to $C_{30}$ monoolefin or said vinyl benzyl chloride in said interpolymer.

2. A composition according to claim 1, wherein said composition is an oil concentrate containing about 20 to 49 wt. % of said additive.

3. A composition according to claim 1, wherein said composition is a lubricating oil composition containing in the range of 0.01 to about 20 wt. % of said additive.

4. A composition according to claim 1, wherein said interpolymer has a molecular weight in the range of about 10,000 to 100,000, said ester is an alkyl methacrylate and said monoolefin is a $C_3$ to $C_6$ olefin.

5. A composition according to claim 4, wherein said monoolefin is isobutylene.

6. A composition according to claim 4, wherein said hydrocarbyl amine is a polyalkylene amine of the formula:

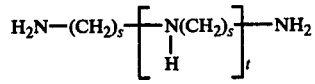

wherein s is 2 to 6 and t is 0 to 10.

7. A composition according to claim 5, which is the reaction product of an interpolymer of dodecylacrylate-isobutylenevinyl benzyl chloride and N,N-dimentyl-1,3-diamino propane.

8. A composition according to claim 5, which is the reaction product of an interpolymer and dodecylacrylateisobutylene-vinyl benzyl chloride and polyethyleneamine.

* * * * *